United States Patent
Nair

(10) Patent No.: US 10,360,523 B2
(45) Date of Patent: Jul. 23, 2019

(54) SYSTEM AND METHOD FOR EXECUTING BUSINESS SERVICES AND ENHANCING BUSINESS PERFORMANCE THROUGH A BUSINESS PROCESS MODELING NOTATION

(71) Applicant: NUWAFIN HOLDINGS LTD, Al-Qusais (UA)

(72) Inventor: Nandakumar Krishnan Nair, Dubai (UA)

(73) Assignee: NUWAFIN HOLDINGS LTD, Al-Qusais, Dubai ( * ) Notice: Subject to any disclaimer, the term of this patent is extended or adjusted under 35 U.S.C. 154(b) by 193 days.

(21) Appl. No.: 14/082,216

(22) Filed: Nov. 18, 2013

(65) Prior Publication Data
US 2015/0142501 A1 May 21, 2015

(51) Int. Cl.
G06F 9/44 (2018.01)
G06Q 10/06 (2012.01)
G06Q 10/08 (2012.01)

(52) U.S. Cl.
CPC ......... *G06Q 10/06316* (2013.01); *G06F 9/44* (2013.01); *G06Q 10/08355* (2013.01)

(58) Field of Classification Search
CPC ......... G06Q 10/00; G06Q 30/02; H04L 29/08
USPC ................................. 705/7.11–7.42
See application file for complete search history.

(56) References Cited

U.S. PATENT DOCUMENTS

| | | | |
|---|---|---|---|
| 2002/0046301 A1* | 4/2002 | Shannon | H04L 63/0227 719/328 |
| 2002/0165903 A1* | 11/2002 | Zargham | G06Q 10/06 709/202 |
| 2003/0232616 A1* | 12/2003 | Gidron | G06Q 30/04 455/406 |
| 2005/0015619 A1* | 1/2005 | Lee | G06Q 10/10 726/4 |

* cited by examiner

*Primary Examiner* — Robert D Rines
(74) *Attorney, Agent, or Firm* — Barry Choobin; Patent 360 LLC

(57) ABSTRACT

The various embodiments herein provide a system and method for executing business services through a business process modeling notation. The system comprising a rule parser to parse the business domain specific rules, a rule object builder to generate a plurality of rule objects to execute the rules, a rule repository to store the rule objects, a rule executor to execute the rule objects, an event listener to store events raised by a business service in an event queue, an event registry to store information related to a plurality of events, an event processor to process the events and an event queue to hold the events which are being processed concurrently. The event processor comprises an event log module, an event router module, a subscriber notification module and a rule invocation module. The performance of the system is enhanced using techniques comprising pre-execution, branch parallelization, branch prediction, branch result caching and distributed task delegation.

9 Claims, 8 Drawing Sheets

| Transaction Attribute | Transaction context for rule object raising the event | Transaction context for event execution | Comments |
|---|---|---|---|
| Required | None | T2 | When the rule object does not have an associated transaction, a new transaction is created for event execution. When the rule object has an associated transaction, that transaction is retained. |
| | T1 | T1 | |
| RequiresNew | None | T2 | A new transaction is created for event execution always. If the rule object has an associated transaction, the new transaction for event execution is a nested child transaction of the rule object's transaction. |
| | T1 | T2 (nested) | |
| Mandatory | None | Error | If the rule object does not have an associated transaction, the event is rejected. Else, the transaction from the rule object is retained. |
| | T1 | T1 | |
| Not Supported | None | None | The event execution does not have an associated transaction. |
| | T1 | None | |
| Supports | None | None | If the rule object has an associated transaction, it is retained for event execution. Else, no transaction is used for event execution. |
| | T1 | T1 | |

FIG. 5

SYSTEM AND METHOD FOR EXECUTING BUSINESS SERVICES AND ENHANCING BUSINESS PERFORMANCE THROUGH A BUSINESS PROCESS MODELING NOTATION

BACKGROUND

Technical Field

The embodiments herein generally relate to business processes and particularly relates to implementing a processing engine for improving the business processes and services. The embodiments herein more particularly relates to an event driven business rule engine and a method for enhancing the business processes by pre-execution, branch parallelization, branch prediction and branch result caching techniques.

Description of the Related Art

A business rule defines the operations and constraints that are applied to people, processes and computing systems in an organization, and are put in place to help an organization to achieve its goals. These rules are typically executed using forward chaining, backward chaining, RETE or other similar inference rule processing algorithms.

A business process (modeled using BPMN) is a flow-chart like sequence of activities formed by wiring together business rules, sub-processes, invocation of web-services, decision points, events and data. The business service is a mechanism to enable access to one or more capabilities of a software system, where the access is provided using a prescribed interface and is exercised consistently with constraints and policies as specified by the service description.

In a Service Oriented Architecture (SOA), software functionality is exposed as a service along with policies to control its usage. The services can be re-used along with business rules in composing other business services.

An event-driven architecture (EDA) is a software architecture pattern for promoting the production, detection, consumption and reaction to events. The architectural pattern is applied by the design and implementation of applications and systems which transmit events among loosely coupled software components and services. An event-driven system typically consists of event emitters (or agents) and event consumers (or sinks).

The event-driven architecture complements service-oriented architecture (SOA) because services are activated by triggers fired on incoming events. The SOA 2.0 is a combination of SOA and EDA architectures to provide a richer, more robust framework for rule processing.

A business rules engine is a software system that executes one or more business rules in a runtime production environment. The business rule system enables company policies and other operational decisions to be defined, tested, executed and maintained separately from the application code.

Information processing in a business rules engine is typically divided into individual, indivisible operations, called transactions. Each transaction must succeed or fail as a complete unit; it cannot remain in an intermediate state. Generally transactions support ACID properties—Atomicity, Consistency, Isolation and Durability.

In a typical Rule Engine, execution of a business service or a business process happens using a single thread. This is relatively slow but requires only lower memory usage. An extreme processing environment has a large memory capacity and multi-threading support. In such an environment, the engine takes advantage of the large number of CPU threads available to enhance performance.

Hence, there is a need for a system and method for improving the performance of business processes. There is also a need for an event driven rule chain execution engine for efficiently executing on or more business services. Further, there is a need for providing certain warm-up operations for speeding up the execution of the business process.

The abovementioned shortcomings, disadvantages and problems are addressed herein and which will be understood by reading and studying the following specification.

SUMMARY

The primary objective of the embodiments herein is to provide a system and method for implementing a processing engine as an event driven rule chain execution engine for efficiently executing on or more business services.

Another object of the embodiments herein is to reduce the execution time of a business service by executing certain warm-up operations related to a business service prior to the actual invocation.

Another object of the embodiments herein is to provide a method and system for parsing rules specified in a rule language which is similar to a natural language.

Another object of the embodiments herein is to provide a method and system to dynamically add new rules to the processing engine during the production phase and construct rule invocation chains.

Another object of the embodiments herein is to provide a method and system for adding new events, event publishers and event subscribers to the processing engine while in production phase.

Another object of the embodiments herein is to provide a method and system for recovering the processing engine from a crash without data loss.

Another object of the embodiments herein is to enable the processing engine to perform distributed event processing by routing across different cluster nodes.

Yet another object of the embodiments herein is to enable the processing engine for supporting transactions including ACID properties comprising Atomicity, Consistency, Isolation and Durability.

These and other objects and advantages of the present embodiments will become readily apparent from the following detailed description taken in conjunction with the accompanying drawings.

The various embodiments of the present disclosure provide a system for executing business services through a business process modeling notation. The system comprising a rule parser to parse one or more business domain specific rules, a rule object builder to generate a plurality of rule objects to execute the rules, a rule repository to store the plurality of rule objects, a rule executor to execute the plurality of rule objects, an event listener to store events raised by a business service in the event queue, an event registry to store information related to a plurality of events, an event queue to hold the one or more events which are being processed concurrently and an event processor to process the events. The event processor comprises an event log module adapted to store the event details onto an event log, an event router module to route the events to one or more cluster nodes in a distributed environment, a subscriber notification module to identify one or more subscribed events of a current event and arrange the one or more subscribed events into the event queue and a rule invocation module to identify and invoke the rule object associated with the proactive execution of the event.

According to an embodiment herein, the system is an event-driven rule execution engine following a SOA 2.0 architectural paradigm.

According to an embodiment herein, the event processor is at least one of a reactive event processor module operative to receive the one or more subscribed events from the event queue and initiate a reactive execution process associated with the one or more subscribed events and a proactive event processor module operative to receive the one or more subscribed events from the event queue and initiate a proactive process associated with the subscribed events.

According to an embodiment herein, the event processor is adapted to directly invoke a rule associate with the event execution, termed as pro-active execution. The event processor is also adapted to create new events that have subscribed to the first event, where these newly triggered events subsequently invoke rules to be executed, called as reactive execution.

According to an embodiment herein, the rule executer is further adapted to execute one or more events based on a configuration of the plurality of rule objects.

According to an embodiment herein, the event registry comprises a link to the rule object to be executed directly (pro-active execution) when the event is received, a list of all subscribed events to be raised (reactive execution) and one or more attributes for transaction management while raising an event.

According to an embodiment herein, system is operative in providing a natural language support for rule authoring, a dynamic editing of rules, events, event publisher information and event subscriber information in runtime, a distributed event processing in a clustered environment, an ACID transaction, a nested transaction and a multi-threading.

Embodiments herein further provide a method for executing business services through a business process modeling notation. The method comprises of invoking a business service, creating a business event, adding the business event to an event queue, performing an event processing. The event processing herein comprises of providing the business event details onto an event log, routing the event to a distributed node if required, stacking the subscribed events onto the event queue in a re-active execution and executing the rule chain corresponding to the event in a pro-active execution.

The method herein further comprising parsing rules specified in a rule language for building one or more rule objects correspond to the rules, wherein the rule language is a natural language adapted to support business domain specific concepts.

According to an embodiment herein, the rule object comprises instructions related to a plurality of operations to be performed, one or more branch conditions to be evaluated, a plurality of rules to be invoked and one or more events to be raised.

According to an embodiment herein, the event processing comprises of executing a plurality of rule chains simultaneously by using multiple thread pools. Here thread pool with a configurable number of threads is associated with each event stage.

The embodiments herein further comprises of adding one or more new business rule objects to the event processors in production, creating one or more rule invocation chains for the newly business rules, storing the rule objects in a rule repository, adding one or more events, event publishers and event subscribers to the processing engine in production and storing event metadata in an event registry. The metadata comprises event information, event publisher information, event subscriber information provided during event authoring.

According to an embodiment herein, the method further comprises of performing a distributed event processing, where one or more events are routed across different cluster nodes in a distributed environment. The method of enhancing performance of the event processing comprises of initiating one or more pre-execution operations to reduce an execution time for a selected rule chain, performing a branch parallelization process wherein one or more execution paths is evaluated to determine a correct execution path whenever there is a branch condition in the rule chain, performing a branch prediction process to predict an execution path following the branch condition in the rule chain, performing a branch result caching where one or more key attributes involved in the branch condition are determined using a rule parsing, wherein the branch condition in the rule chain indicates occurrence of an if condition and performing a distributed task delegation using a map-reduce technique.

According to an embodiment herein, the pre-executable operations comprises of business service lookup, business service policy validations, authentication, authorization, object instantiations and an environment preparation for distributed event execution.

According to an embodiment herein, the branch result caching employs a hash map to store the branch condition results, where the hash map key is composed by concatenating the values of one or more key attributes involved in the branch condition, which are determined by rule parsing.

According to an embodiment herein, the distributed task delegation using Map-Reduce technique enhances the performance of the processing engine by breaking down the execution sequence into a subset of smaller parallelizable execution sequences, termed as tasks. These tasks are then delegated to different 'worker' nodes in the cluster using the standard Map-Reduce technique. During the MAP process, the 'Master' node will break down the execution sequence into smaller tasks and delegate them to the 'worker' nodes. During the REDUCE process, the 'Master' node will take the answers to all the sub-problems from the 'worker' nodes and combine them to produce the final output.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 5 illustrates a table describing a plurality of scenarios for a new event based on a transaction attribute, according to an embodiment of the present disclosure.

Figure 1:
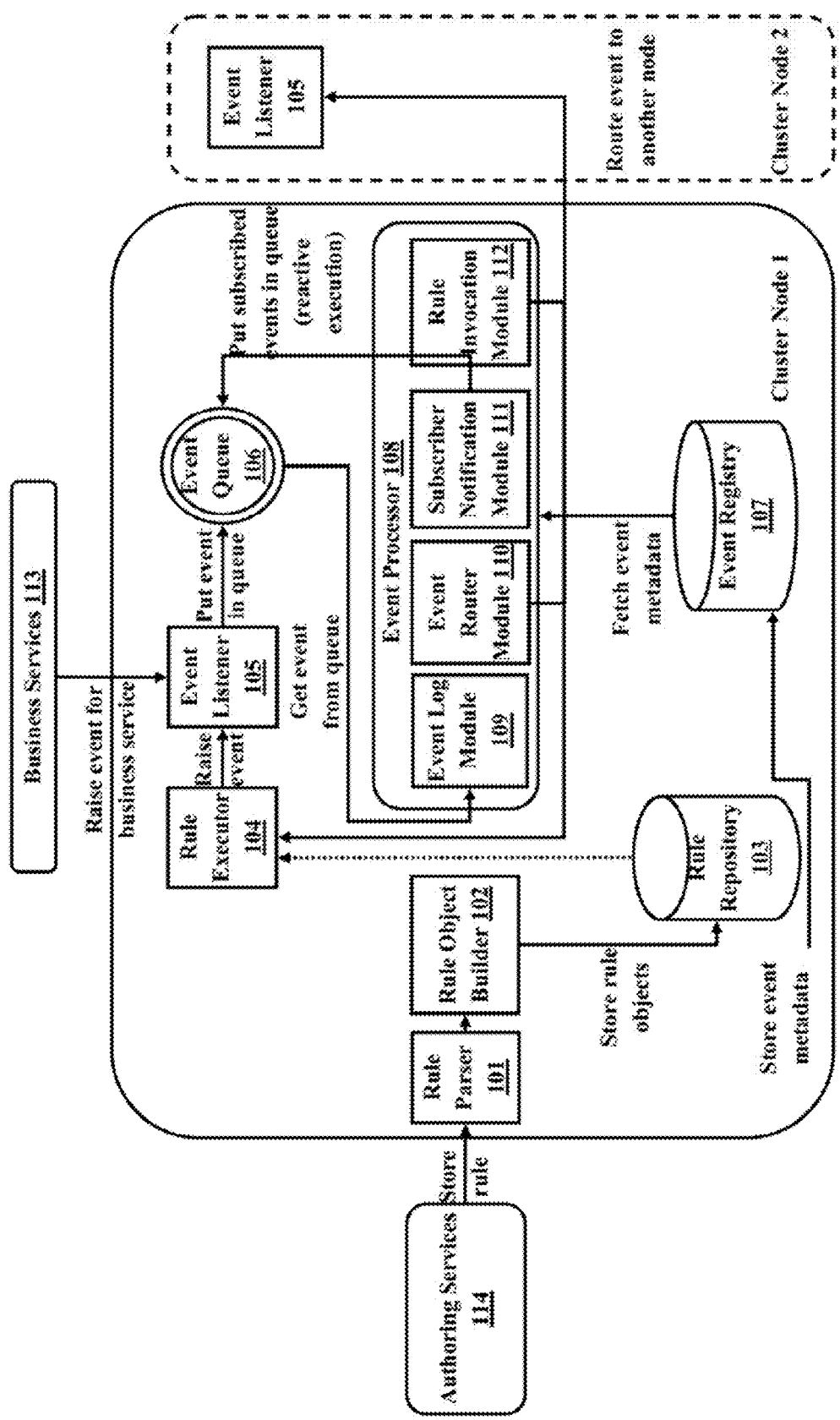
FIG. 1 is a block diagram illustrating architecture of an event driven rule chain execution engine, according to an embodiment of the present disclosure.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present disclosure provide a system for executing business services through a business process modeling notation. The system comprising a rule parser to parse one or more business domain specific rules, a rule object builder to generate a plurality of rule objects to execute the rules, a rule repository to store the plurality of rule objects, a rule executor to execute the plurality of rule objects, an event listener to store events raised by a business service in an event queue, an event registry to store information related to a plurality of events, an event queue to hold the one or more events which are being processed concurrently and an event processor to process the events. The event processor comprises an event log module adapted store the event details onto an event log, an event router module to route the events to one or more cluster nodes in a distributed environment, a subscriber notification module to identify one or more subscribed events of a current event and arrange the one or more subscribed events into the event queue and a rule invocation module to identify and invoke the rule object associated with the proactive execution of the event.

The processing engine is designed as an event-driven rule chain execution engine following the SOA 2.0 architectural paradigm. The Processing Engine has an ability to parse rules specified in a rule language that is very similar to natural language. The rule language supports business domain specific constructs. When a business service is invoked, the Processing Engine executes the rule chain corresponding to that service. As part of executing the rule chain, events are triggered and the rule chains for the subscribed events will be invoked. These rule chains of subscribing events triggers further events. The business service finishes once all rules/events triggered by the invocation of that service are completed.

The rule executer is further adapted to execute one or more events based on a configuration of the plurality of rule objects. New rules are added to the processing engine while in production. When new rules are added, rule invocation chains are constructed for the business rules and stored in a Rule Repository.

Similarly new events, event publishers and event subscribers are added to the processing engine while in production. Event metadata is stored in an event registry.

The event registry comprises a link to the rule object to be executed directly when the event is received (proactive execution), a list of all subscribed events to be raised (reactive execution) and one or more attributes for transaction management while raising an event.

The processing engine is operative in providing a natural language support with business domain specific constructs for rule authoring, a dynamic editing of rules, events, event publisher information and event subscriber information in runtime, a distributed event processing in a clustered environment, an ACID transaction, a nested transaction and a multi-threading.

Embodiments herein further provide a method for executing business services through a business process modeling notation. The method comprises of invoking a business service, creating a business event, adding the business event to an event queue, performing an event processing. The event processing herein comprises of providing the business event details onto an event log, routing the event to a distributed node if required, stacking the subscribed events onto the event queue in a re-active execution and executing the rule chain corresponding to the event in a pro-active execution.

The method herein further comprising parsing rules specified in a rule language for building one or more rule objects correspond to the rules, wherein the rule language is a natural language adapted to support business domain specific concepts.

The rule object comprises instructions related to a plurality of operations to be performed, one or more branch conditions to be evaluated, a plurality of rules to be invoked and one or more events to be raised.

The event processing comprises of executing a plurality of rule chains simultaneously by using multiple thread pools. Here thread pool with a configurable number of threads is associated with each event stage. An event queue stores incoming events. Multiple threads pick up events for processing from the queue. Multiple rule chains are executed simultaneously using multiple threads.

The embodiments herein further comprises of adding one or more new business rule objects to the event processors in production, creating one or more rule invocation chains for the newly business rules, storing the rule objects in a rule repository, adding one or more events, event publishers and event subscribers to the processing engine in production and storing event metadata in an event registry. The metadata comprises event information, event publisher information, event subscriber information provided during event authoring.

The Processing Engine supports distributed event processing. Events are also routed across different cluster nodes in a distributed system. If the subscriber for an event is a service that is residing in another cluster node, the event is then routed to that particular node.

The method of enhancing performance of the event processing comprises of initiating one or more pre-execution operations to reduce an execution time for a selected rule chain, performing a branch parallelization process wherein one or more execution paths is evaluated to determine a correct execution path whenever there is a branch condition in the rule chain, performing a branch prediction process to predict an execution path following the branch condition in the rule chain and performing a branch result caching where one or more key attributes involved in the branch condition are determined using a rule parsing, wherein the branch condition in the rule chain indicates occurrence of an if condition.

The pre-executable operations comprises of business service lookup, business service policy validations, authentication, authorization, object instantiations and an environment preparation for distributed event execution.

The branch result caching employs a hash map to store the branch condition results, where the hash map key is composed by concatenating the values of one or more key attributes involved in the branch condition, which are determined by rule parsing.

The event framework has the ability to log events as they are being executed. If the system crashes, events from pending business transactions are replayed after the system is rebooted. This allows the processing engine to recover from crashes without data loss.

FIG. 1 is a block diagram illustrating architecture of an event driven rule chain execution engine, according to an embodiment of the present disclosure. The event driven rule chain execution engine is also known as processing engine. The processing engine executes business services through a business process modeling notation. The processing engine comprises as rule parser 101, a rule object builder 102, a rule repository 103, a rule executor 104, an event listener 105, an event registry 107 and an event processor 108. The rule parser 101 parses one or more business domain specific rules based on the rules authored by authoring services 114. The rule object builder 102 generates a plurality of rule objects to execute the rules. The rule repository 103 stores the plurality of rule objects. The rule executor 104 executes the plurality of rule objects. As part of the rule execution, based on the rule object's configuration, further events are allowed to be raised by the rule executor 104. The event listener 105 stores events raised by a business service in an event queue 106. Specifically, when a business service is invoked from an external system, a corresponding event is raised. The event listener 105 puts the raised event into the event queue 106. The event registry 107 fetches event metadata from the event processor and also stores event metadata information.

The event processor 108 comprises a plurality of modules to process the events. Also, an event processing occurs in multiple event stages. The multiple event stages are configured to pick up events from the event queue 106 and process them. The multiple event stages use multi-threading to achieve parallelization. Each event stage adopts an associated thread pool, comprising a configurable number of threads. When a thread in any event stage's thread pool becomes free, and if there is an event in the event queue 106 that requires to be processed by that event stage, the free thread is utilized to process the event. The event processor 108 comprises four key stages/modules which are an event log module 109, an event router module 110, a subscriber notification module 111 and a rule invocation module 112. In addition to the four stages/modules, other custom event processing stages/modules are also allowed to be added. The event log module 109 is adapted store the event details onto an event log. This event log module 109 is also used to replay events back for processing, and supports disaster recovery. The event router module 110 routes the events to one or more cluster nodes in a distributed environment. The event router module 110 is used for load balancing purposes and in cases where a particular cluster node does not have the proactive rule object stored in its repository. The subscriber notification module 111 identifies one or more subscribed events of a current event and provides the one or more subscribed events into the event queue 106. The events are eventually picked up for processing i.e. reactive execution. The rule invocation module 112 identifies and invokes the rule object associated with the proactive execution of the event. The business services 113 are finished once all rules/events triggered by the invocation of the specified business service is completed.

Figure 2:
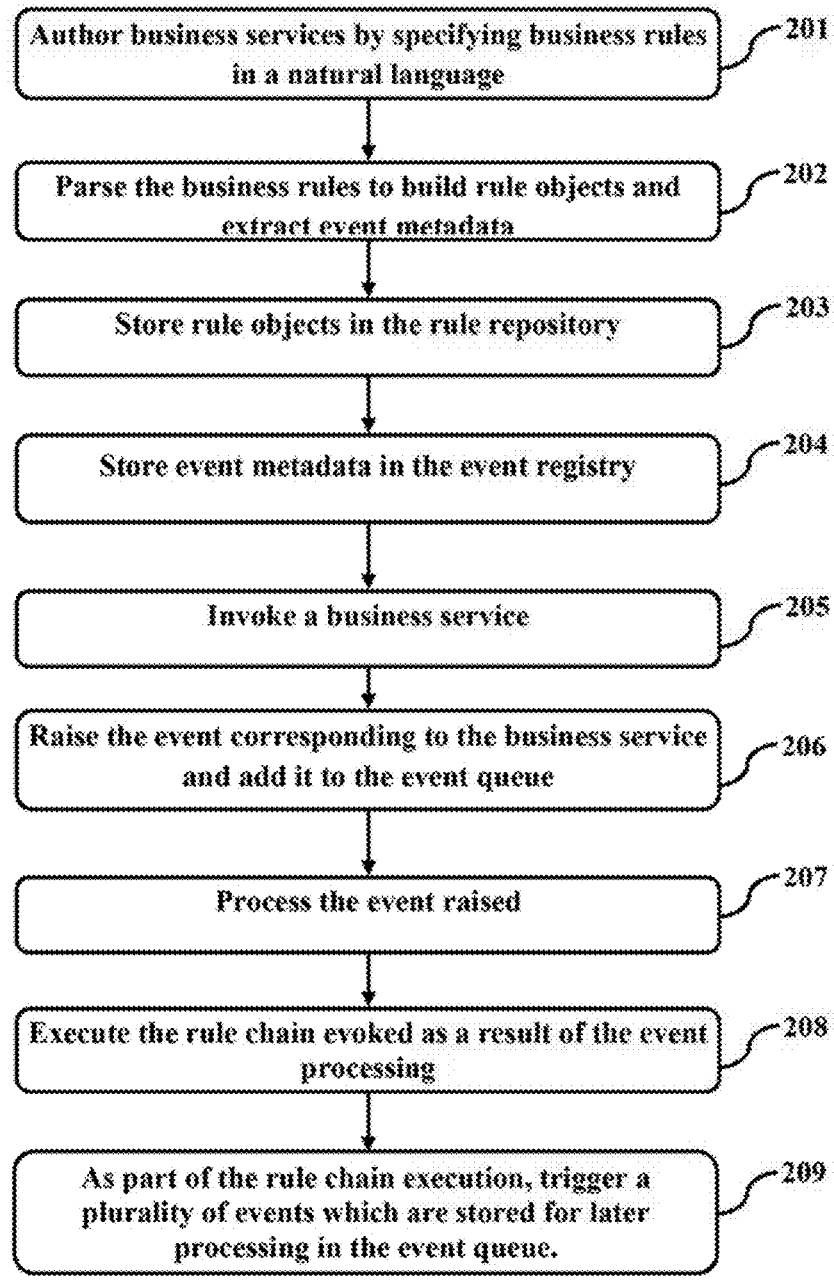
FIG. 2 is a flow chart illustrating a process for executing business services through a business process modeling notation, according to an embodiment of the present disclosure.

FIG. 2 is a flow chart illustrating a process for executing business services through a business process modeling notation, according to an embodiment of the present disclosure. The processing engine implements services using a SOA 2.0 architecture. A business service is a mechanism to enable access to one or more capabilities of a software system, where the access is provided using a prescribed interface and is exercised consistent with constraints and policies as specified by the service description. A user initiates a request and, one or more business services are authored by specifying business rules in a natural language by an authenticated authoring service (201). The business rules are then parsed to build rule objects and extract event metadata (202). Further store the rule objects in the rule repository (203) and store event metadata in the event registry (204). Further invoke a business service (205). Subsequently one or more events corresponding to the business service is raised and adds the events to the event queue (206). Further process the events raised (207). The event processing herein comprises event logging, event routing to another node, notify all subscribed events and rule invocation. The rule chain is then evoked as a result of the event processing (208). Further, trigger a plurality of events which are stored for later processing in the event queue as a part of the rule chain execution (209).

Figure 3:
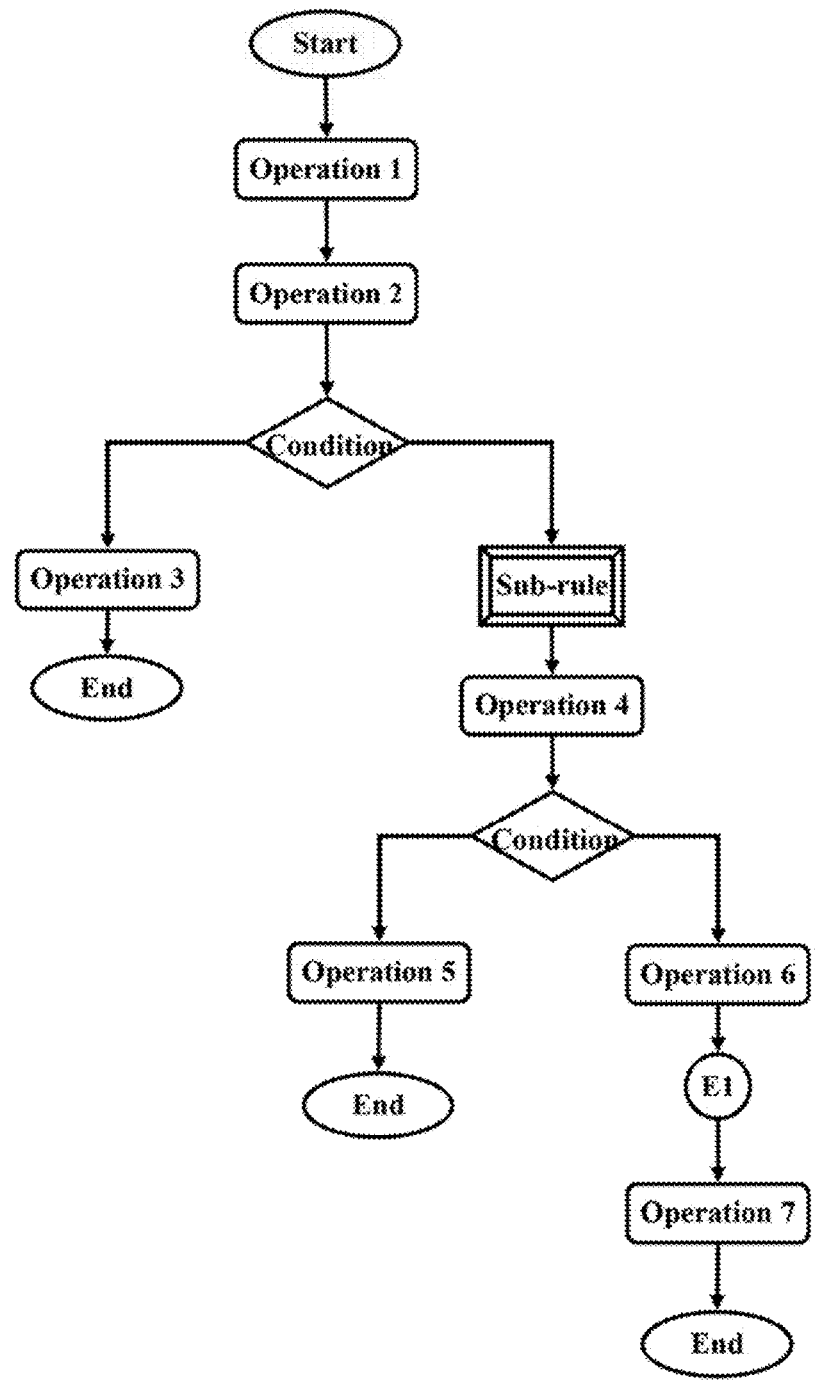
FIG. 3 illustrates a flowchart of a rule object for executing rules of a business process, according to an embodiment of the present disclosure.

FIG. 3 illustrates a flowchart of a rule object for executing rules of a business process, according to an embodiment of the present disclosure. The rules are specified using a natural language that has business domain-specific constructs. Such rules are parsed by the rule parser. The parsed rules then executed by the rule object which is built by a rule object builder. The one or more rule objects are then stored in a rule repository. By using the authoring service, rules and events metadata such as event information, publisher/subscriber information are added to the processing engine dynamically, even during production.

With respect to FIG. 3, the rule object represents a flowchart comprising a plurality of operations to be performed, conditions to be evaluated, other rules to be invoked and one or more events to be raised. The rule object executes operation 1 followed by operation 2. Next, based on a condition, the control of execution goes to operation 3 or to the sub-rule. The flow of execution is terminated after the operation 3. Whereas, an operation 4 is executed after a sub-rule. The control after executing the operation 4, again leads to a condition which in turn leads to operation 5 or operation 6. The execution ends if operation 5 is executed, whereas after executing operation 6 an event E1 is raised. After the event E1, an operation 7 is executed and the complete process ends. The operation 1 through the operation 7 comprises but not limited to any one or combination of a service lookup, a service policy validations, an authentication, an authorization, an object instantiations, and an environment preparation for distributed execution.

Figure 4:
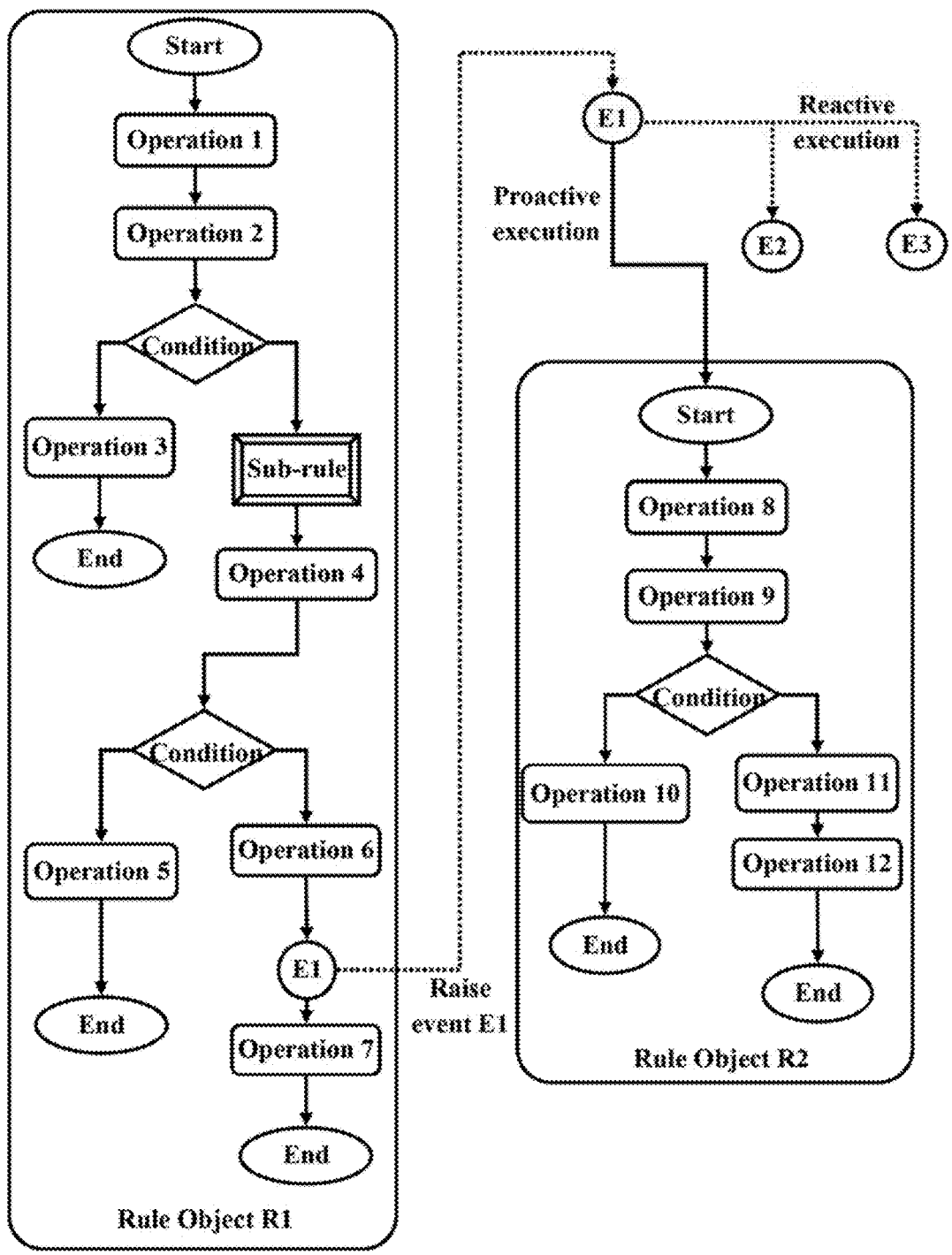
FIG. 4 illustrates a flowchart depicting a reactive execution phase and proactive execution phase of an event for a business process, according to an embodiment of the present disclosure.

FIG. 4 illustrates a flowchart depicting a reactive execution phase and proactive execution phases of an event for a business process, according to an embodiment of the present disclosure.

There are two rule objects, a rule object R1 and a rule object R2. With reference to FIG. 3, the rule object R1 comprises plurality of similar or different operations arranged in sequence and in parallel paths. Further, one or more sub-rules are defined to process certain specific operation. As part of executing the rule object R1, an event E1 is raised. The event E1 is associated with the rule object R2, and the rule object R2 is directly invoked for proactive execution. The rule object R2 comprises a plurality of operations arranged in sequence or in multiple paths. In the rule object R2, an operation 8 is executed followed by operation 9. After executing the operation 9, based on a condition, the control of the execution either goes to operation 10 or operation 11. When the control goes to operation 11, the entire process ends after executing a following operation 12. The raised event E1 further comprises two subscribed events E2 and E3. The subscribed events E2 and E3 are raised for execution reactively. For every event, the event registry comprises following three aspects which are a link to the rule object to be executed directly when the event is received (proactive execution), a list of all subscribed events to be raised (for reactive execution), and attributes for transaction management while raising an event. In the list of all subscribed event to be raised, each of the subscribed events comprises their own rule objects for proactive execution and lists of further events to be raised for reactive execution. The operation 1 through the operation 12 comprises but not limited to any one or combination of a service lookup, a service policy validations, an authentication, an authorization, an object instantiations and an environment preparation for distributed execution.

With respect to FIG. 4, the event processing adopts two mechanisms namely, a proactive event processing and a reactive event processing. For each event a rule chain associated in the event registry. In proactive execution, this rule chain is executed directly when the event is triggered. The mechanism is suitable for multiple other subscribers for a particular event. In reactive execution, when the event is triggered, the subscribers are notified and rule chains of the subscribers are then executed.

FIG. 5 illustrates a table describing a plurality of scenarios for a new event based on a transaction attribute, according to an embodiment of the present disclosure. In the table, five scenarios are discussed with respect to different transaction attributes. In the first scenario the transaction attribute is set to "Required". When the rule object does not have an associated transaction shown as "None", then a new transaction T2 is created for event execution. Similarly, when the rule object has an associated transaction T1, that transaction is retained as T1 for the event execution. In the second scenario the transaction attribute is set to "RequiresNew". In the second scenario, always a new transaction T2 is created for event execution when an rule object does not have an associated transaction. If the rule object has an associated transaction T1, the new transaction T2 for event execution is a nested child transaction of the rule object's transaction T1. In the third scenario, the transaction attribute is set to "Mandatory". Here, if the rule object does not have an associated transaction, the event is rejected and an error is occurred. Otherwise, when the rule object has an associated transaction say T1, then that transaction from the rule object is retained as T1. In the fourth scenario, the transaction attribute is set to "Not Supported". In this scenario the event execution does not have an associated transaction whether there is any even object say T1 or there are none of the event objects at all. In the fifth scenario the transaction attribute is "supports". Here, if the rule object has an associated transaction say T1, then the same is retained for event execution, else no transaction is used for event execution.

Figure 6:
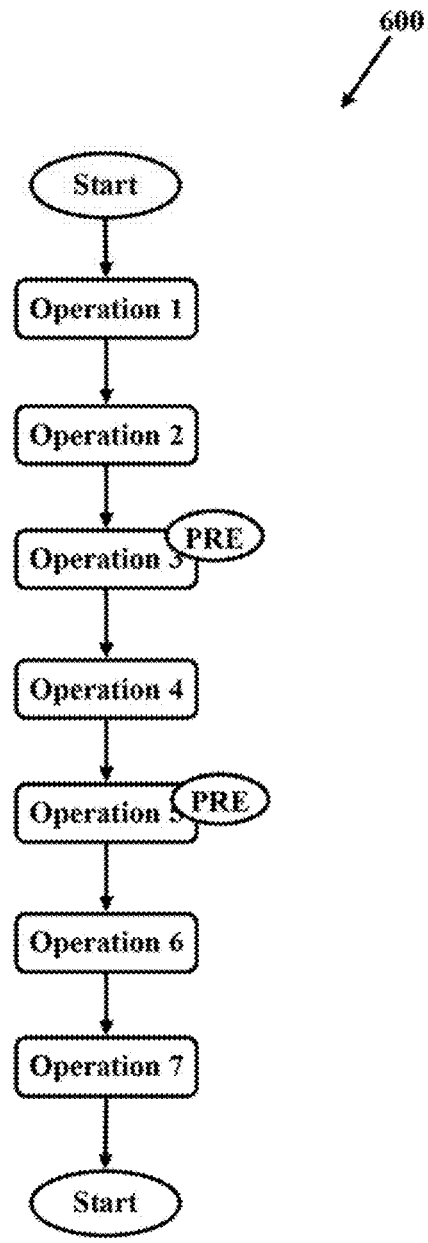
FIG. 6 is a flow chart illustrating pre-execution process for enhancing performance of the processing engine, according to an embodiment of the present disclosure.

FIG. 6 is a flow chart illustrating a pre-execution process for enhancing performance of the processing engine, according to an embodiment of the present disclosure. A rule object 600 is shown as an example comprises multiple operations in sequence with two operations, namely operation 3 and operation 5 having a pre-execution phase indicated by PRE. The rule object 600 executes the entire process from operation 1 through operation 7. When the rule object is being executed, there are several operations that get executed even before the execution control reaches the operations. If any free threads are available in the rule execution stage, those threads are utilized to pre-execute those operations. Such pre-executable operations are determined (tagged "PRE") during rule authoring. Typically, these include warm-up operations like service lookup, service policy validations, authentication, authorization, object instantiations, environment preparation for distributed execution. The operation 1 through the operation 7 comprises but not limited to any one or combination of a service lookup, a service policy validations, an authentication, an authorization, an object instantiations, and an environment preparation for distributed execution. While configuring business services, a system administrator is allowed to use a "warm-up" tag to indicate that certain operations are executed before the actual service invocation to reduce the execution time.

Figure 7:
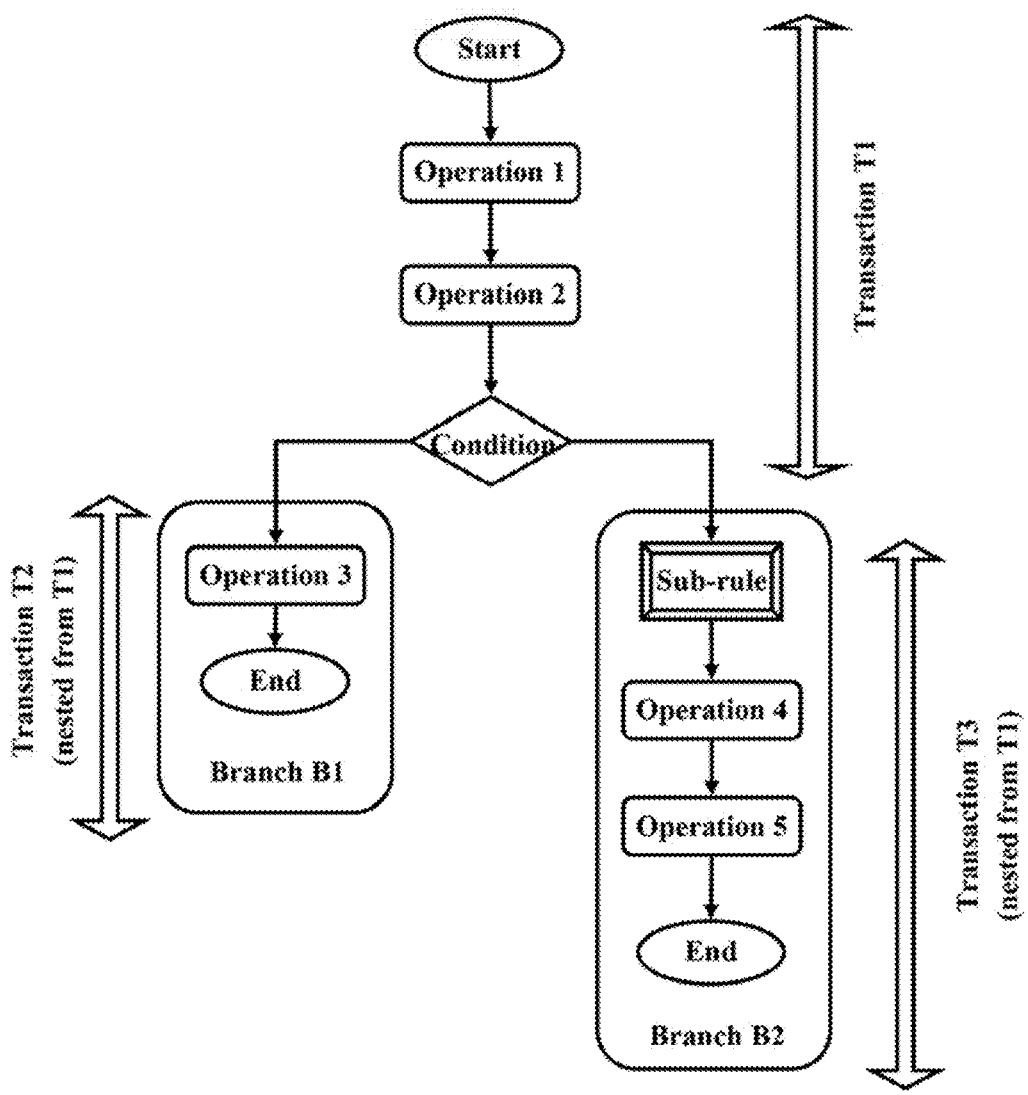
FIG. 7 is a flow chart illustrating a branch parallelization method for enhancing performance of the processing engine, according to an embodiment of the present disclosure.

FIG. 7 is a flow chart illustrating a branch parallelization method for enhancing performance of the processing engine, according to an embodiment of the present disclosure. While executing a rule object with more than one route due to a conditional element, the rule executor executes both branches, a branch B1 and a branch B2 simultaneously while the condition is being evaluated. The branch B1 comprises an operation 3. The branch B2 comprises executing a sub-rule, an operation 4 and followed by an operation 5. Three threads are used comprising a Thread 1 which continue to evaluate the condition in transaction context T1, a Thread 2 which execute branch B1 in transaction context T2, and is a nested child of T1, and a Thread 3 which execute branch B2 in transaction context T3, and is a nested child of T1. If the evaluation of the condition finds that branch B1 is to be executed, the Thread 3 is terminated and transaction T3 is rolled back. If the evaluation finds that branch B2 is to be executed, then Thread 2 is terminated and transaction T2 is rolled back. After evaluation, the Thread 1 also stops executing and is freed. The statistics on the time taken to complete the evaluation of different conditions are tracked. Over time, if a particular condition is historically found to be very time consuming, this optimization technique are used in those cases. The operation 1 through the operation 5 comprises but not limited to any one or combination of a service lookup, a service policy validations, an authentication, an authorization, an object instantiations, and an environment preparation for distributed execution.

With respect FIG. 7, in general situations where multiple paths of execution are possible, the processing engine loads all possible combinations of paths into memory using different threads and prepare for execution. When the execution path is determined dynamically at run time, the context corresponding to the chosen path (which is already loaded and ready) is then executed.

Figure 8:
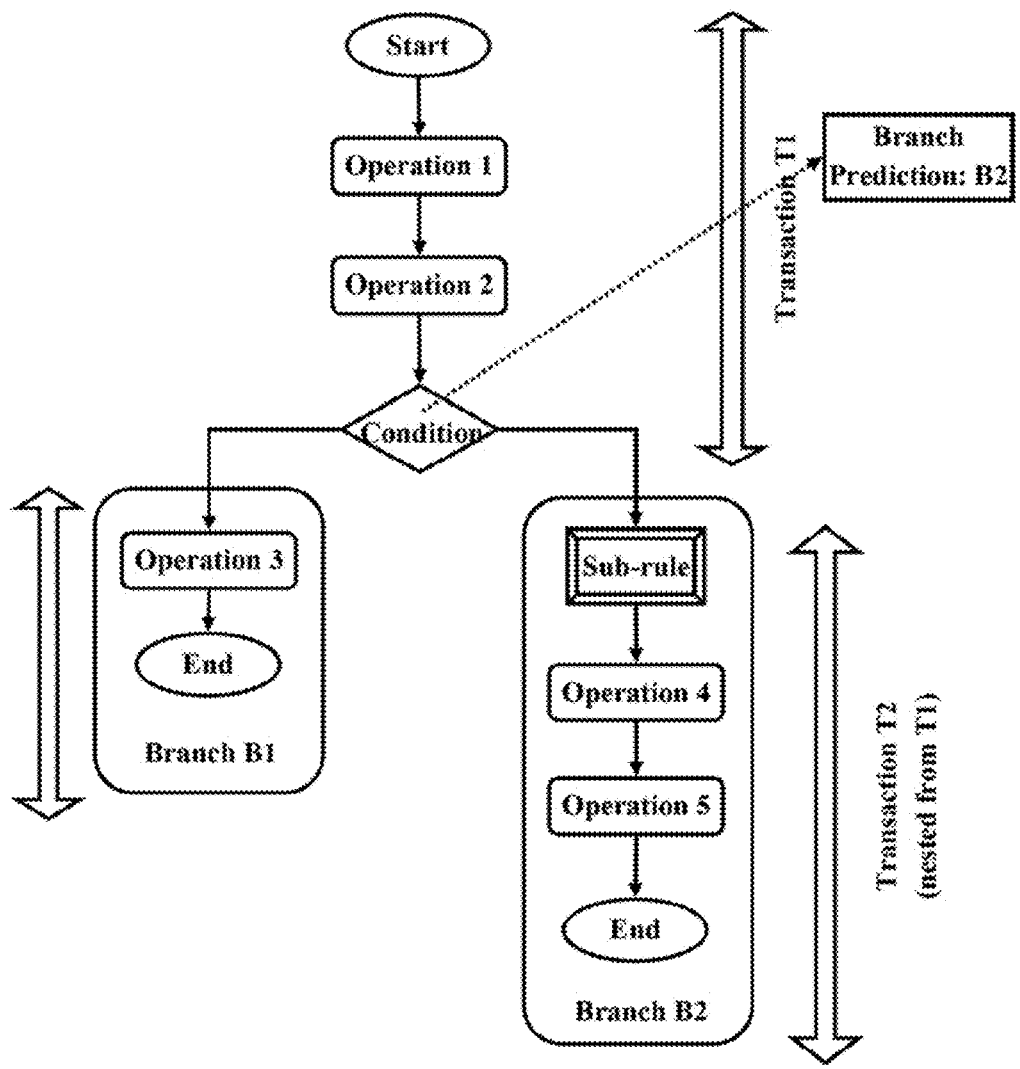
FIG. 8 is a flow chart illustrating a branch prediction method for enhancing performance of the processing engine, according to an embodiment of the present disclosure.

FIG. 8 is a flow chart illustrating a branch prediction method for enhancing performance of the processing engine, according to an embodiment of the present disclosure. Consider an illustration where the rule executor predicts that branch B2 must be taken following the condition's evaluation. While executing the rule object, the rule executor executes branch B2 simultaneously while the condition is being evaluated (i.e.) two threads are used, a Thread 1 to continue evaluating the condition in transaction context T1, and a Thread 2 executes branch B2 in transaction context T2, which is a nested child of T1. If the condition evaluation finds that B1 is to be executed, the Thread 2 is terminated and transaction T2 is rolled back. The Thread 1 continues executing branch B1 in the context of transaction T1. If the condition evaluation finds that B2 is to be executed, the Thread 2 is allowed to continue. After evaluation, the Thread 1 also stops executing and is freed. The execution time is significantly reduced based on the predictions. The operation 1 through the operation 5 comprises but not limited to any one or combination of a service lookup, a service policy validations, an authentication, an authorization, an object instantiations, and an environment preparation for distributed execution.

According to an embodiment herein, there are several conditions which are very frequently repeated. The rule executor keeps track of statistics on which branch is executed following the condition's evaluation. Over time, for some specific conditions, the processing engine is able to reasonably predict which branch must be taken following the condition's evaluation. In other words, the processing engine predicts the outputs from a particular operation for a specific set of inputs. In such cases, the processing engine creates a new thread to continue execution with the predicted outputs. The original thread is allowed to continue to determine if the prediction was correct or not. If the prediction is determined to be correct, the new thread (with predicted output values) are continued to be executed and the overall processing time is reduced. If the prediction is determined to be incorrect, the new thread (with predicted output values) is terminated and execution continues along the original thread.

According to an embodiment herein, the processing engine supports multi-threading. The event processing is a stage-driven process in which thread pools with configurable number of threads are associated with each event stage. An event queue stores all incoming events. Multiple threads pick up events for processing from the event queue. Multiple rule chain is executed simultaneously using multiple threads. The processing engine also supports distributed event processing. The events are allowed to be routed across different cluster nodes in a distributed system. If the subscriber for an event is a service that is residing in another cluster node, the event is routed to that particular node. Further, the processing engine supports transactions with ACID property. Nested transactions are also supported.

According to an embodiment herein, the performance of a processing engine can be enhanced by a plurality of techniques comprising pre-execution, branch parallelization, branch prediction, branch result caching and distributed task execution using map reducing technique.

According to an embodiment herein, the pre-execution is a technique used to reduce the execution time for a particular rule chain. The pre-execution involves executing certain "warm-up" operations in the rule chain upon invocation, prior to execution control actually reaching those steps in the rule chain.

According to an embodiment herein, the branch parallelization is a method in which whenever there is a branching in the rule chain (an 'if' condition), both execution paths are executed before the 'if' condition is evaluated and the correct execution path is determined. After evaluation is completed, the incorrect execution path is discontinued and rolled back. The correct execution path is allowed to continue.

According to an embodiment herein, the branch prediction is a variation of the branch parallelization technique in which the execution path following the 'if' condition is predicted based on historical information. The execution of the predicted path begins while the 'if' condition is evaluated. If the prediction is found to be correct (statistically common scenario), the execution is allowed to continue. If the prediction is found to be incorrect (statistically rare scenario), the execution is rolled back and the correct path is then executed.

According to an embodiment herein, a method for enhancing performance of the processing engine using branch result caching is provided. The method comprises a hash map to store the branch condition results. The hash map key is composed by concatenating the values of the key attributes involved in the branch condition, which are determined by rule parsing. As an illustration, suppose the key attributes in the branch condition are Customer_Name, Product_Code and Date_Of_Transaction. Then, the hash map's key corresponds to: <Customer_Name>.<Product_Code>.<Date_Of_Transaction>. The hash map value is the branch condition decision, which is typically expressed as 'true' or 'false'. Before the branch condition is evaluated, the hash map is checked to see if there is a 'hit' (i.e.) if there is a previous entry in the hash map with the same key as the present execution. If there is no 'hit', the branch condition is evaluated, and then a new hash map entry is inserted into the hash map. In case of a hit, the hash map entry is retrieved and the hash map entry value is used to determine the execution path.

According to an embodiment herein, the performance of the processing engine is enhanced through a Distributed Task Delegation using Map-Reduce technique. The performance of the Processing Engine can be enhanced by breaking down the execution sequence into a subset of smaller parallelizable execution sequences called 'tasks'. These tasks can be delegated to different 'worker' nodes in the cluster using the standard Map-Reduce technique.

During the MAP process, the 'Master' node breaks down the execution sequence into smaller tasks and delegate them to the 'worker' nodes. During the REDUCE process, the 'Master' node takes the answers to all the sub-problems from the 'worker' nodes and combine them to produce the final output.

According to an embodiment herein, a method and system to reduce the execution time for a business process is provided. The execution time of the business process is reduced by loading the contexts of different paths that the business process is likely to take to make them ready for execution.

According to an embodiment herein, a method and a system is provided to reduce execution time for common operations using prediction. For operations that are frequently repeated, the processing engine tries to predict the outcome for a given set of input values. The execution continues with the predicted outcome values using a new thread. If the prediction is found to be correct, the execution time has been reduced and the new thread with the predicted outcome values continues execution. If the prediction is determined to be incorrect, a new execution begins with the actual outcome values (not predicted values) and the other threads with the predicted outcome values are be abandoned.

According to an embodiment herein, the processing engine performs a reverse digestion of the rule to decide which parameters of a rule must affect its result. Then, the processing engine easily predicts the rule's result based on the statistically significant parameters which affect its result, without going through the whole rule execution process. A separate thread is allowed to be used to verify the validity of the predictions before committing the transactions that were executed based on the predictions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method implemented in a first cluster node forming part of a distributed computing environment, said first cluster node comprising a processor and a memory communicably coupled to the processor, for executing business services through a business process modeling notation, the method comprising the following steps:

invoking a business service using the processor, and selectively enhancing by said processor, execution of the business service, wherein the step of selectively enhancing the execution of the business service includes the following steps:

creating, by the processor, during execution of said business service, a hash map incorporating a plurality of hash map entries, each of said plurality of hash map entries being a combination of a hash map key and a hash map value corresponding to a plurality of historical branch conditions incorporated within a plurality of rule chains corresponding to said business service under execution;

creating, by the processor, a business event corresponding to said business service;

adding, by the processor, the business event to a queue stored on the memory;

processing, by the processor, the business event and executing, by the processor, at least one rule chain corresponding to the business event, and determining that the rule chain incorporates at least one branch condition;

responsive to the rule chain is determined, by the processor, to be incorporating said at least one branch condition:

triggering, by the processor, said first cluster node to at least temporarily withhold evaluation of said at least one branch condition;

parsing, by the processor, said at least one branch condition, and extracting, by the processor, key attributes deemed to be satisfying said at least one branch condition, based on historical information corresponding to the rule chain incorporating said at least one branch condition;

concatenating, by the processor, said key attributes, to form a hash map key corresponding to said at least one branch condition;

accessing, by the processor, said hash map prior to said execution of said at least one branch condition;

comparing, by the processor, each hash map key present within the hash map, with the hash map key corresponding to said at least one branch condition; and determining, by the processor, that at least one hash map key present within the hash map matches the hash map key corresponding to said at least one branch condition;

responsive to the matching of the at least one hash map key present within the hash map to the hash map key corresponding to said at least one branch condition:

retrieving, by the processor the hash map key determined to match the hash map key corresponding to said at least one branch condition;

retrieving, by the processor, the hash map value corresponding to the hash map key determined to match the hash map key corresponding to said at least one branch condition;

triggering, by the processor, said first cluster node to forego said evaluation of said at least one branch condition, and dynamically determining, by the processor, an execution path corresponding to said at least one branch condition, without evaluating said at least one branch condition, based on the retrieved hash map key and retrieved hash map value, thereby reducing an execution-time associated with said rule chain and thereby enhancing the execution of said business service;

analyzing, by the processor, said execution path corresponding to said at least one branch condition, and identifying, by the processor, at least one rule object to be invoked during an execution of said at least one branch condition based on said execution path;

determining, by the processor, that said memory of said first cluster node does not incorporate said at least one rule object necessary to be invoked during said execution of said at least one branch condition based on said execution path;

responsive to determining said memory of said first cluster node is does not incorporate said at least one rule object necessary to be invoked during said execution of said at least one branch condition based on said execution path:

identifying, by the processor, a second cluster node within said distributed computing network, incorporating said at least one rule object;

routing said rule chain incorporating said at least one branch condition, to said second cluster node identified as incorporating said at least one rule object; and triggering, by the processor, said second cluster node to execute said rule chain incorporating said at least one branch condition, using said at least one rule object and based on said execution path, thereby reducing said execution-time associated with said rule chain and thereby enhancing the execution of said business service in said distributed environment.

2. The method as claimed in claim 1, wherein the method further comprises the step of parsing rules specified in a rule language using said processor, for building one or more rule objects corresponding to the rules, wherein the rule language is a natural language configured to support business domain specific concepts.

3. The method as claimed in claim 1, wherein the step of processing the business event, further includes the step of executing, by the processor, said plurality of rule chains simultaneously by using multiple thread pools, wherein each thread pool with a configurable number of threads is associated with an each stage of said business event.

4. The method as claimed in claim 1, wherein the method further includes the step of performing, by the processor, a distributed event processing, wherein a plurality of business events corresponding to said business service are routed across at least said first cluster node and said second cluster node in said distributed computing environment.

5. The method as claimed in claim 1, wherein the method further includes the step of breaking down the execution of the rule chain into smaller tasks and delegating the smaller tasks to a plurality of worker nodes during implementation of a Map phase of the Map-Reduce technique, and the step of combining the results from the plurality of worker nodes to produce a final output during implementation of a Reduce phase of the Map-Reduce technique.

6. A computer readable non-transitory storage medium having computer readable instructions stored thereupon, said computer readable instructions when executed by a computer processor, cause the computer processor to:
invoke a business service on a first cluster node, said first cluster node incorporated within a distributed computing environment;
execute said business service on said first cluster node;
create, during an execution of said business service, a hash map incorporating a plurality of hash map entries, each of said plurality of hash map entries being a combination of a hash map key and a hash map value corresponding to a plurality of historical branch conditions incorporated within a plurality of rule chains corresponding to said business service under execution;
create a business event corresponding to said business service;
add the business event to a queue stored on a memory of said first cluster node;
process the business event and initiate an execution of at least one rule chain corresponding to the business event, and determine if the rule chain incorporates at least one branch condition;
only in an event the processor determines the rule chain to be incorporating said at least one branch condition, further cause the processor to:
trigger said first cluster node to at least temporarily withhold evaluation of said at least one branch condition;
parse said at least one branch condition, and extract key attributes deemed to be satisfying said at least one branch condition, based on historical information corresponding to the rule chain incorporating said at least one branch condition;
concatenate said key attributes to form a hash map key corresponding to said at least one branch condition;
access said hash map prior to said execution of said at least one branch condition;
compare each hash map key present within the hash map, with the hash map key corresponding to said at least one branch condition; and
determine whether any hash map key present within the hash map matches the hash map key corresponding to said at least one branch condition;
only in an event a hash map key present within the hash map is determined, by the processor, to match the hash map key corresponding to said at least one branch condition, cause the processor to:
retrieve the hash map key determined to match the hash map key corresponding to said at least one branch condition;
retrieve the hash map value corresponding to the hash map key determined to match the hash map key corresponding to said at least one branch condition;
trigger said first cluster node to forego said evaluation of said at least one branch condition, and dynamically determine an execution path corresponding to said at least one branch condition, without evaluating said at least one branch condition, based on the retrieved hash map key and retrieved hash map value, thereby reducing an execution-time associated with said rule chain and thereby enhancing the execution of said business service;
analyze said execution path corresponding to said at least one branch condition, and identify at least one rule object to be invoked during an execution of said at least one branch condition based on said execution path;
determine whether said memory of said first cluster node incorporates said at least one rule object necessary to be invoked during said execution of aid at least one branch condition based on said execution path;
only in an event said memory of said first cluster node is determined, by the processor, as not incorporating said at least one rule object necessary to be invoked during said execution of said at least one branch condition based on said execution path, cause the processor to:
identify a second cluster node within said distributed computing environment, incorporating said at least one rule object;
route said rule chain corresponding to said at least one branch condition, to said second cluster node identified as incorporating said at least one rule object; and
trigger said second cluster node to execute said rule chain incorporating said at least one branch condition, using said at least one rule object, thereby reducing said execution-time associated with said rule chain and thereby enhancing the execution of said business service in said distributed computing environment.

7. The computer readable non-transitory storage medium as claimed in claim 6, wherein said computer readable instructions when executed by the computer processor, further cause the computer processor to:
analyze rules specified in a rule language and build said rule object corresponding to the rules;
execute said plurality of rule chains simultaneously by using multiple thread pools, and associate each thread pool with a configurable number of threads at an each stage of said business event; and perform distributed event processing, and route a plurality of business events corresponding to said business service across at least said first cluster node and said second cluster node in said distributed environment.

8. A computer implemented system for executing business services through a business process modeling notation, said system comprising;

a first cluster node incorporated within a distributed computing environment, said first cluster node comprising a processor, and a memory module communicably coupled with the processor, said processor configured to:

invoke a business service on said first cluster node, said first cluster node;

execute said business service on said first cluster node;

create, during an execution of said business service, a hash map incorporating a plurality of hash map entries, each of said plurality of hash map entries being a combination of a hash map key and a hash map value corresponding to a plurality of historical branch conditions incorporated within a plurality of rule chains corresponding to said business service under execution;

create a business event corresponding to said business service;

add the business event to a queue stored on said memory module of said first cluster node;

process the business event and initiate an execution of at least one rule chain corresponding to the business event, and determine if the rule chain incorporates at least one branch condition;

only in an event the rule chain is determined to be incorporating said at least one branch condition;

trigger said first cluster node to at least temporarily withhold evaluation of said at least one branch condition;

parse said at least one branch condition, and extract key attributes deemed to be satisfying said at least one branch condition, based on historical information corresponding to the rule chain incorporating said at least one branch condition;

concatenate said key attributes to form a hash map key corresponding to said at least one branch condition;

access said hash map prior to said execution of said at least one branch condition;

compare each hash map key present within the hash map, with the hash map key corresponding to said at least one branch condition; and determine whether any hash map key present within the hash map matches the hash map key corresponding to said at least one branch condition;

only in an event a hash map key present within the hash map is determined, to match the hash map key corresponding to said at least one branch condition:

retrieve the hash map key determined to match the hash map key corresponding to said at least one branch condition;

retrieve the hash map value corresponding to the hash map key determined to match the hash map key corresponding to said at least one branch condition;

trigger said first cluster node to forego said evaluation of said at least one branch condition, and dynamically determine an execution path corresponding to said at least one branch condition, without evaluating said at least one branch condition, based on the retrieved hash map key and retrieved hash map value, thereby reducing an execution-time associated with said rule chain and thereby enhancing the execution of said business service;

analyze said execution path corresponding to said at least one branch condition, and identify at least one rule object to be invoked during an execution of said at least one branch condition based on said execution path;

determine whether said memory module of said first cluster node incorporates said at least one rule object necessary to be invoked during said execution of aid at least one branch condition based on said execution path;

only in an event said memory module of said first cluster node is determined to be not incorporating said at least one rule object necessary to be invoked during said execution of said at least one branch condition based on said execution path:

identify a second cluster node within said distributed computing environment, incorporating said at least one rule object;

route said rule chain corresponding to said at least one branch condition, to said second cluster node identified as incorporating said at least one rule object; and trigger said second cluster node to execute said rule chain incorporating said at least one branch condition, using said at least one rule object and based on said execution path, thereby reducing said execution-time associated with said rule chain and thereby enhancing the execution of said business service in said distributed computing environment.

9. The system as claimed in claim 8, wherein the processor is further configured to:

analyze rules specified in a rule language and build at least one rule object corresponding to the rules;

execute said plurality of rule chains simultaneously by using multiple thread pools, and associate each thread pool with a configurable number of threads at an each stage of said business event; and perform distributed event processing, and route a plurality of business events across at least said first cluster node and said second cluster node in said distributed computing environment.

* * * * *